INVENTORS.
SHINICHI AKAI &
TAKASHI SHIMODA

BY
CAROTHERS & CAROTHERS
THEIR ATTORNEYS

United States Patent Office 3,623,905
Patented Nov. 30, 1971

3,623,905
GALLIUM COMPOUNDS WITH REDUCED SILICON CONTAMINATION AND A METHOD OF MANUFACTURING THEM
Shinichi Akai, Toyonaka, and Takashi Shimoda, Osaka, Japan, assignors to Sumitomo Electric Industries, Ltd., Osaka, Japan
Filed Nov. 4, 1969, Ser. No. 873,783
Claims priority, application Japan, Nov. 6, 1968, 43/81,104; Nov. 27, 1968, 43/87,143; July 24, 1969, 44/58,563; July 29, 1969, 44/60,182
Int. Cl. B44d 1/02, 1/18; H01l 7/36
U.S. Cl. 117—201
11 Claims

ABSTRACT OF THE DISCLOSURE

This invention relates to a method of manufacturing gallium compounds such as GaAs, GaP, $Ga_{1-x}In_xAs$, $Ga_{1-x}Al_xAs$, $GaAs_{1-x}P_x$ and $Ga_{1-x}In_xP$, with a reduced level of silicon contamination, $x$ being a number ranging from 0 to 1, inclusive of 0 and exclusive of 1, and gallium compound crystals prepared by the method. The method comprises such a step that when manufacturing a gallium compound in a sealed fused silica reaction tube, at least one of silicon, a silicon compound, boron, a boron compound, aluminum and an aluminum compound is added into the vessel supporting the melt of the compound, particularly the fused silica vessel, and at the same time oxygen or a metallic oxide which is unstable at the temperature of the furnace and which can form a gallous oxide ($Ga_2O$) atmosphere is added into the sealed fused silica reaction tube, whereby silicon in the melt is removed and a thin film of a stable oxide is formed around the melt to suppress silicon contamination for a long time. The vapor of gallous oxide reduces the concentration of free silicon in the melt, while the film of a stable oxide around the melt remarkably reduces the free space where gallous oxide can be freshly produced, silicon contamination being thus suppressed for a long time. Besides for the reduction of silicon contamination, this method can further be used for the doping with an impurity other than silicon.

BACKGROUND OF THE INVENTION

This invention relates to gallium compound crystals and techniques for preparing them, particularly to a method of reducing silicon contamination in materials manufactured in a sealed fused silica reaction tube.

Among gallium compounds which are useful for practical purposes in the semiconductor industry are many semiconducting compounds which include gallium arsenide (GaAs), gallium phosphide (GaP), gallium indium arsenide ($Ga_{1-x}In_xAs$), gallium aluminum arsenide ($Ga_{1-x}Al_xAs$), gallium arsenide phosphide ($GaAs_{1-x}P_x$), and gallium indium phosphide ($Ga_{1-x}In_xP$), $x$ being any number between 0 and 1. These compound semiconductors are materials of great importance for functional devices and solid state optical devices.

As methods for the manufacture of single crystals of compound semiconductors, the magnetic Czochraski method, liquid-encapsulation pulling method, horizontal Bridgman method, gradient freeze method, zone melting method, etc. are known. Most of these methods include a process in which materials are melted in a high purity fused silica reaction tube. As vessels to support the melted materials, vessels of fused silica ($SiO_2$), alumina ($Al_2O_3$), aluminum nitride (AlN), boron nitride (BN), etc. are used. However, it is fused silica vessels that are generally used, because fused silica vessels of high quality are readily available.

When gallium compounds are melted in a fused silica vessel at a temperature of about 1000° C. or higher, silica ($SiO_2$) reacts with gallium (Ga) and liberates free silicon, which contaminates the materials. This undesirable silica dissociation reaction may be represented by the formula below when the reaction takes place from the left side to the right.

$$4Ga + SiO_2 \rightleftharpoons 2Ga_2 + Si \qquad (1)$$

The method which is generally adopted for the purpose of preventing the from-left-to-right progress of this reaction is to synthesize the material in an oxygen or oxide atmosphere, especially in a gallous oxide ($Ga_2O$) atmosphere. This method is described in detail in U.S. Pat. 3,353,912 to Norman Ainslie. However, this method has a serious drawback. That is, the gallous oxide vapor which has been introduced comes to react with the volatile constituents of the compound, as shown by the formulae given below, so that the vapor pressure of gallous oxide becomes lowered. As a result, the reaction (1) progresses from left to right and makes it impossible to suppress silicon contamination for the long time required for crystal growth.

$$3Ga_2O + As_4 \rightleftharpoons Ga_2O_3 + 4GaAs \qquad (2)$$

$$3Ga_2O + 2P_2 \rightleftharpoons Ga_2O_3 + 4GaP \qquad (3)$$

Another method for suppressing the from-left-to-right progress of reaction (1) is a method in which the surface of the material is covered with the melt of boric oxide ($B_2O_3$) to reduce the free space around the melt of the material, thereby suppressing the generation of gallous oxide vapor and thus reducing silicon contamination. This is referred to as the liquid-encapsulation pulling method and is described in detail in the literature, S. J. Bass and P. E. Oliver, Gallium Arsenide: 1966 Symposium Procedings (1967, p. 41. This method, too, has serious drawbacks. They are that boric oxide of high quality is not readily available, that boric oxide is highly hydroscopic and consequently is difficult to handle, and that high purity compounds are required as raw materials because a gallium compound cannot be synthesized directly from the constituents. That high purity compounds are required as raw materials themselves is a very serious drawback. It means that the purity of the end product is determined by the purity of raw materials synthesized by other methods.

SUMMARY OF THE INVENTION

According to the present invention, silicon contamination can be suppressed for a long time and, besides that, a gallium compound with reduced silicon contamination can be synthesized directly from the constituents, by adding at least one of silicon (Si), a silicon compound, boron (B), a boron compound, aluminum (Al) and an aluminum compound to the material in the vessel, particularly a fused silica vessel, and preparing the material in an oxygen or oxide atmosphere, when manufacturing a gallium compound in a sealed fused silica reaction tube.

This invention will be exemplified by a case where gallium arsenide as a gallium compound is melted in a fused silica vessel in a sealed fused silica reaction tube and silicon and arsenic trioxide ($As_2O_3$) as an oxide material are simultaneously added for the preparation of the compound. The main object of this invention is to suppress for a long time the silicon contamination from the vessel supporting the material, particularly a fused silica vessel, when manufacturing a gallium compound in a sealed fused silica reaction tube. It, therefore, goes without saying that the material to be synthesized is not limited to gallium arsenide.

With respect to the preparation of gallium arsenide, it is believed that, when an oxygen or oxide atmosphere is present during synthesis, the oxygen combines with gallium to form a gallous oxide atmosphere. This reaction can be stimulated by adding oxygen in the reaction tube or by the use of a metallic oxide such as an arsenic trioxide which is unstable at the temperature of the furnace and liberates its oxygen which, in turn combines with gallium to form gallous oxide.

The undesirable silica dissociation reaction that occurs when a fused silica vessel contacts a gallium or gallium arsenide melt can be represeted by reaction (1). Therefore, the presence of excess gallous oxide ($Ga_2O$) in the gas phase suppresses this reaction and prevents contamination by silicon.

Moreover, if a trace of silicon is previously added to the melt gallium or gallium arsenide, gallous oxide in the gas phase and the silicon react with each other and will not only suppress the from-left-to-right progress of reaction (1) but also eventually causes reaction (1) to progress from right to left. In consequence, the silicon in the melt of gallium or gallium arsenide becomes silicon dioxide ($SiO_2$) which is either moved away to the surface of the melt or gets combined with the inner surface of the fused silica vessel. The silicon dioxide which has been moved away to the surface of the melt covers the surface of the melt in a thin film, while it is believed that the silicon dioxide which has become combined with the inner surface of the fused silica vessel crystallizes in the form of a crystobalite during the preparation of the compound.

If the quantity of oxygen or a metallic oxide added is in excess of the quantity to produce gallous oxide in a quantity sufficient to oxidize all the silicon in the gallium or gallium arsenide melt into silicon dioxide, the activity of silicon remaining in the gallium or gallium arsenide melt when a steady state is reached may be given by the expression:

$$a_{Si} = \frac{K(T)}{[P_{Ga_2O}]^2} \quad (4)$$

where $a_{Si}$ represents the activity of silicon in the melt (proportional to silicon concentration in the melt); K(T), quilibrium constant of reaction (1) at the temperature T of the melt; and $P_{Ga_2O}$, the vapor pressure of excess gallous oxide. If excess gallous oxide is present, therefore, almost all the silicon added to the melt is removed in the form of silicon dioxide. Since the surface of the melt in a steady state is covered with a thin film of silicon dioxide, the undesirable silica dissociation reaction cannot take place even after the silicon added to the melt has been removed. This is because of the fact that while it is necessary to generate the vapor of gallous oxide for the reaction (1) to take place from left to right, there is no longer present any free space for the generation of gallous oxide, since the surface of the melt is covered with a thin film of silicon dioxide. Thus, it is possible to reduce silicon contamination over a long period of time by previously adding a very small quantity of silicon to the melt of gallium or gallium arsenide and preparing gallium arsenide in an atmosphere of gallous oxide. Furthermore, it is possible to synthesize gallium arsenide crystals of little silicon contamination directly from the constituents, gallium and arsenic. It is moreover possible to alter the vapor pressure of excess gallous oxide by varying the quantity of oxygen or a metallic oxide added and, as a result of this, to alter the concentration of residual silicon in the melt in accordance with expression (4). This eventually makes it possible to vary the concentration of silicon in the crystal finally obtained.

In place of silicon previously added to the melt, a material which is capable of forming a stable oxide film over the melt at the furnace temperature, e.g. boron and aluminum, may be used with similar effects. Beryllium (Be) and magnesium (Mg) are also capable of forming a stable oxide film at the furnace temperature, but it is preferable to avoid using them because beryllium and magnesium unfavorably affect the electrical properties of gallium compounds.

An object of this invention is to provide techniques to manufacture gallium compound crystals with reduced silicon contamination.

Another object of this invention is to provide gallium compound crystals of a larger size with reduced silicon contamination which have a better homogeneity than products manufactured by methods heretofore employed.

Another object of this invention is to provide a method of manufacturing gallium compound crystals which is capable of controlling the concentration of residual silicon.

Another object of this invention is to provide large size gallium compound crystals in which the concentration of residual silicon is controlled to be more homogeneous than in products manufactured by a method heretofore used.

Another object of this invention is to provide a method of manufacturing gallium compound crystals with reduced silicon contamination and doped with an impurity other than silicon.

Another object of this invention is to provide gallium compound crystals of a larger size having a better homogeneity than those manufactured by methods heretofore used, which have reduced silicon contamination and which are doped with an impurity other than silicon.

Another object of this invention is to provide a method of manufacturing gallium compound crystals, which gives as little stress as possible to the growing crystals when seeding and which reduces dislocation density in the crystals obtained.

Another object of this invention is to provide a method of manufacturing high purity gallium compound crystals, which is adaptable to mass production.

Another object of this invention is to provide a method of manufacturing high purity gallium compound crystals, which is economical.

Another object of this invention is to provide a method of manufacturing high purity gallium compound crystals, which is adaptable to zone refining techniques.

Another object of this invention is to provide a method of manufacturing gallium compound crystals with reduced silicon contamination and homogeneously doped with an impurity other than silicon, which is adaptable to zone leveling techniques.

Another object of this invention is to provide a method which, when manufacturing single crystals of semi-insulating gallium arsenide to be manufactured by doping chromium (Cr) in a quantity smaller than the quantity of chromium heretofore used for doping.

Another object of this invention is to provide single crystals of high resistivity and semi-insulating gallium arsenide which contain a smaller quantity, particularly 2.0 p.p.m. or less of chromium, than products heretofore produced and which have less crystal defects.

A characteristic of this invention is that, when a gallium compound is manufactured in a sealed fused silica reaction tube, a method of manufacturing a gallium compound in an oxygen or oxide atmosphere after adding to the melt of the compound a metal or non-metal which can form a stable oxide at the furnace temperature is utilized.

Another characteristic of this invention is that when manufacturing a gallium compound in a sealed fused silica reaction tube, one or or more of silicon, a silicon compound, boron, a boron compound, aluminum or an aluminum compound is added into the vessel supporting the melt of the compound, particularly a fused silica vessel and at the same time oxygen or a metallic oxide which is unstable at the temperature of the furnace and which is capable of forming a gallous oxide atmosphere is added in the sealed fused silica reaction tube, thereby obtaining gallium compound crystals with reduced silicon contamination Another characteristic of this invention is that when manufacturing a gallium compound in a sealed fused silica reaction tube, silicon contamination is reduced by the formation of excess gallous oxide atmosphere, while at the same time at least one of silicon, a silicon compound, boron, a boron compound, aluminum and an aluminum compound is previously added into the vessel supporting the melt of the compound in order to have an oxide film containing one or more of silicon dioxide ($SiO_2$), boron trioxide ($B_2O_3$) and aluminum trioxide ($Al_2O_3$) formed, thereby suppressing silicon contamination for a long time.

The foregoing and other objects, features and advantages of this invention will be apparent from the following more particular description of preferred embodiments of the invention as illustrated in the accompanying drawings.

Figure 1:
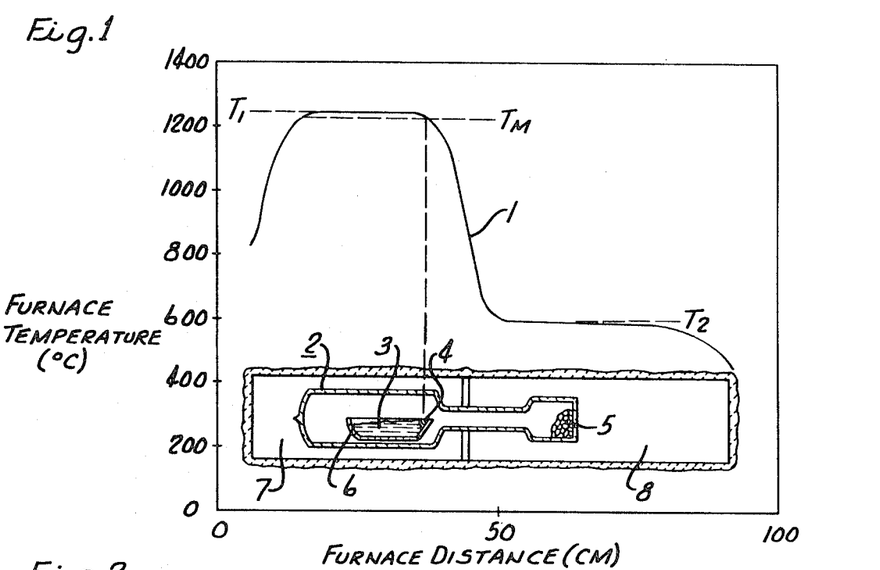
FIG. 1 illustrates the first technique of this invention, for manufacturing high purity gallium arsenide with reduced silicon contamination by the horizontal Bridgman technique. It comprises a schematic diagram of the crystal growing furnace, the temperature distribution of the furnace and a section of the sealed fused silica reaction tube.
Figure 2:
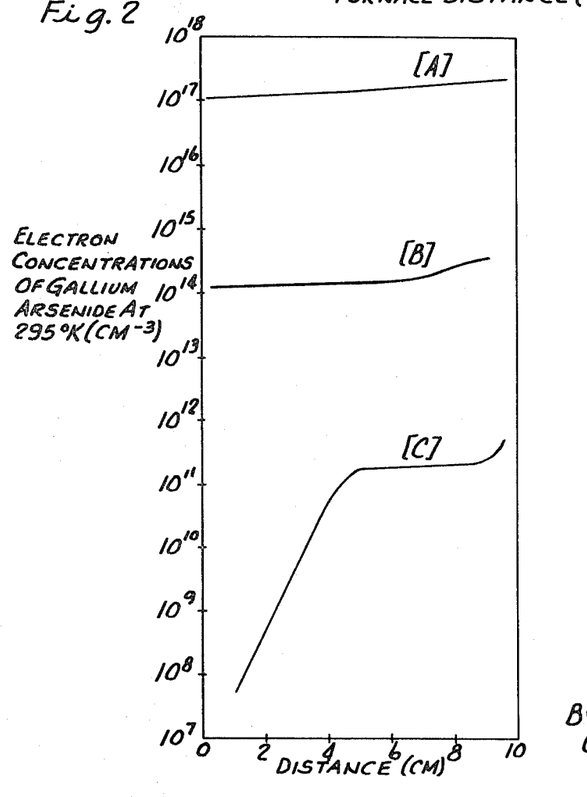
FIG. 2 shows the distribution of electron concentrations at 295° K. in the longitudinal direction of n-type gallium arsenide manufactured by the method shown in FIG. 1 in comparison with that of a crystal manufactured by a method heretofore in use.

In FIG. 1 there is shown the temperature distribution 1 of the crystal growing furnace for manufacturing gallium arsenide by the horizontal Bridgman technique, the sealed fused silica tube 2, gallium or gallium arsenide melt 3 and a single crystal seed 4 in the fused silica vessel 6 in the reaction tube, arsenic 5, the high temperature zone 7 and low temperature zone 8. The temperature $T_1 = 1250°$ C.–1270° C., $T_2 = 610°$ C.–640° C., and $T_m =$ the melting point of gallium arsenide, that is about 1240° C. The reaction tube is previously evacuated to a pressure of $10^{-5}$ mm. of mercury. When a steady state is reached after the introduction of the reaction tube into the furnace, the melt of gallium arsenide is formed and a vapor pressure of 0.9—several atmospheres is obtained in the reaction tube because of arsenic 5. If the furnaces 7 and 8 are moved at a speed of 5–50 mm. per hour to the left in relation to the reaction tube in this condition, a single crystal of gallium arsenide can be formed. If nothing other than gallium and arsenic are put in the reaction tube, the reaction (1) takes place in the left-to-right direction, causing silicon contamination, so that the crystal obtained will contain approximately $10^{16}$–$2 \times 10^{17}$ cm.$^{-3}$ of silicon. The curve [A] of FIG. 2 shows an instance of the properties of such a crystal heretofore prepared.

As methods already known for the prevention of such silicon contamination, there are, as already stated, a method in which gallium arsenide is prepared in an oxygen or oxide atmosphere and a method in which gallium arsenide is prepared with the melt of gallium arsenide covered with the melt of boric oxide. One of the methods to eliminate the serious drawback inherent to these methods is to add a very small quantity of silicon to the melt of gallium arsenide and at the same time to prepare gallium arsenide in an atmosphere of gallous oxide.

The following are examples of the method of manufacture comprising this invention for producing gallium compounds with reduced contamination.

Example 1

When manufacturing gallium arsenide by the horizontal Bridgman technique already explained with reference to FIG. 1, 30.00 g. gallium of purity of 99.9999% and 3 mg. high purity silicon of an electrical resistivity of 100 ohm cm. or more were placed in a high purity silica vessel (super semiconductor grade) as shown in FIG. 1 and 34.25 g. arsenic of a purity of 99.9999% was placed in the low temperature zone of the reaction tube 2, and in addition, 15 mg. arsenic trioxide (99.9999%) was put in the high temperature zone of the reaction tube 2. The fused silica reaction tube used had been purified in a hydrogen atmosphere for 8 hours at 1250° C. The temperature of the electric furnaces shown in FIG. 1 were so set that $T_1 = 1260°$ C. and $T_2 = 630°$ C. and the growth rate was controlled to be 20 mm. per hour to form a single crystal of gallium arsenide. The crystal produced had a thin film of silicon dioxide remaining on the surface, and both top and bottom of the crystal were shiny. Except for several mm. portions at the back and front ends of the length of the crystal, it was found to be a perfect single crystal. The electron concentration at 295° K. was found to have values shown by the curve [B] in FIG. 2. The Hall mobility of electrons at 295° K. was 5,000–10,000 cm.$^2$/v. sec. If compared with the curve [A] in FIG. 2 which shows the properties of gallium arsenide prepared without adding anything to gallium and arsenic, a remarkable improvement in purity can be seen from this. It is particularly worthy of note that silicon contamination is reduced down to the back of the crystal.

Example 2

When manufacturing gallium arsenide by the horizontal Bridgman technique as in Example 1, 30.00 g. gallium of a purity of 99.9999% and 1 mg. high purity silicon of an electrical resistivity of 100 ohm cm. or more were placed in the high purity silica vessel and 34.25 g. arsenic of a purity of 99.9999% was placed in the low temperature zone of the reaction tube 2, with 8 mg. arsenic trioxide (99.9999%) being further added in the high temperature zone of the reaction tube 2. A gallium arsenide single crystal was thus prepared, the other conditions being the same as in Example 1. The appearance of the crystal thus obtained was closely resembled to that of the crystal obtained in Example 1, but the oxide film remaining on the surface was found to be somewhat less than that in Example 1. The electron concentration of the crystal at 295° K. showed values represented by the curve [C] in FIG. 2. That is to say, the electron concentration at room temperatures was not in excess of $10^{12}$ cm.$^{-3}$ throughout the whole of the crystal. The electron Hall mobility was 3,000–10,000 cm.$^2$/v. sec.

In FIG. 2, the vertical axis represents the electron concentration of gallium arsenide at 295° K. and the horizontal axis the distance from the front of the crystal (the right side of the crystal 3 of FIG. 1). It can be seen from the figure that, as compared with the properties represented by the curve [A] of gallium arsenide prepared from gallium and arsenide without any addition thereto, how excellent the properties of the products of Example 1 and Example 2 represented by the curve [B] and the curve [C] respectively are:

Apart from the aforementioned examples, the crystals of high purity gallium arsenide can be obtained with addition of silicon and arsenic trioxide in various quantities. The amount of silicon and arsenic trioxide that are added is not critical. A single crystal of high purity gallium arsenide can be prepared with an amount of silicon ranging from 0.1 mg. to 200 mg. and an amount of arsenic trioxide ranging from 0.5 mg. to 200 mg. for 100 g. of gallium arsenide to be obtained.

From Example 1 and Example 2, it may be seen that high purity gallium arsenide with silicon contamination reduced for a long time can be obtained. At the same time as silicon contamination is reduced like this, the reaction between the silica reaction vessel and gallium or gallium arsenide melt is suppressed, so that the wetting of the vessel by the melt is prevented and a single crystal with few crystal defects can therefore grow readily.

Now we will describe the role played by the silicon added to the melt of gallium or gallium arsenide and the arsenic trioxide added into the reaction tube.

The arsenic trioxide added in the sealed fused silica reaction tube begins to vaporize at a temperature of 135° C. or higher into molecules of $As_4O_6$ and then, reacting with gallium, produces gallous oxide. These reactions may be represented by the formulae:

$$As_2O_3(\text{solid}) \rightarrow \tfrac{1}{2} As_4O_6(\text{gas}) \text{ at temperatures above } 135° \text{ C.} \quad (5)$$

and $$\tfrac{1}{2} As_4O_6 + 6Ga \rightarrow 3Ga_2O + \tfrac{1}{2} As_4 \quad (6)$$

The silicon added to gallium forms GaAs-Si melt together with arsenic, and increases the silicon activity in the belt. In consequence, the gallous oxide (Ga$_2$O) generated by the reaction represented by Formula 6 and the silicon in the melt react with each other, and as a result the reaction (1) progresses from right to left, so that silicon is removed to the surface of the melt in the form of silicon dioxide. The silicon dioxide removed to the surface of the melt covers the melt in the form of a thin film. The silicon dioxide removed onto the silica vessel crystallizes into a crystobalite in a long time.

The activity of residual silicon in the melt of gallium arsenide tends to approach the value given by the Equation 4. The vapor pressure of excess gallous oxide, $P_{Ga_2O}$, is dependent on the amount of arsenic trioxide added (the excess amount with respect to the amount of silicon), the geometric shape, and the temperature profile of the furnace, so that the amount of residual silicon is also dependent on these factors. Once a thin film of silicon dioxide is formed around the melt of gallium arsenide, the reaction (1) will no longer progress from left to right, even if the vapor pressure of excess gallous oxide becomes small. This is because the free space around the melt is restricted by the film of silicon dioxide, so that no fresh supply of gallous oxide vapor can be generated.

A similar effect was obtained by using, in place of silicon, a silicon compound such as silicon arsenide (SiAs), or silicon diarsenide (SiAs$_2$). A similar effect was obtained also by using, in place of silicon, boron, a boron compound, aluminum or an aluminum compound.

A similar effect was obtained by using, in place of arsenic trioxide as a material capable of generating the vapor of gallous oxide, oxygen or a metallic oxide which is unstable at the temperature of the furnace, such as silver oxide (Ag$_2$O), carbon dioxide (CO$_2$), mixture of carbon (C) and gallic oxide (Ga$_2$O$_3$), gallic oxide and arsenic pentoxide (As$_2$O$_5$).

Example 3

Figure 3:
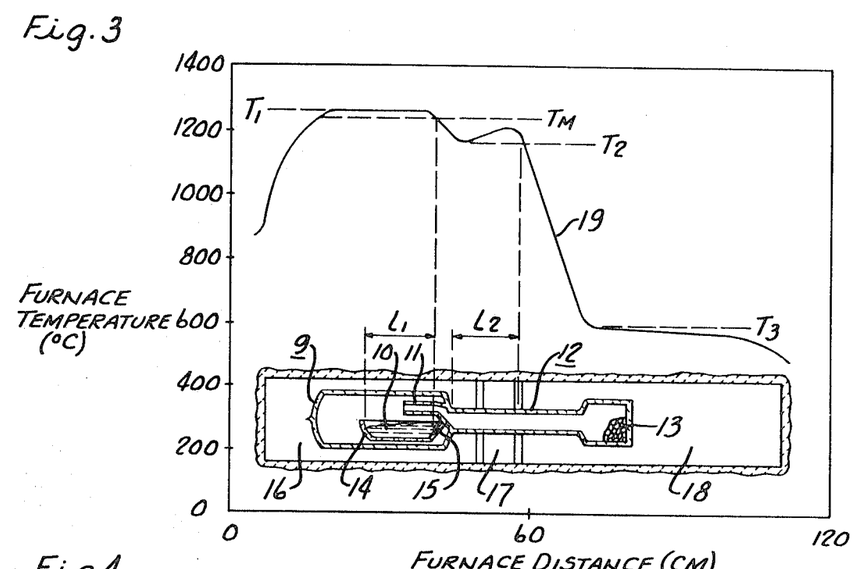
FIG. 3 illustrates a second technique of the present invention for manufacturing gallium arsenide with reduced silicon contamination and gallium arsenide with controlled concentration of residual silicon by means of a furnace having three temperature regions. It comprises a schematic diagram of the crystal growing furnace, the temperature distribution of the furnace and a cross sectional diagram of the sealed fused silica reaction tube.

When it was desired to increase the vapor pressure of excess gallous oxide effectively, a furnace having a temperature distribution as shown in FIG. 3 was used.

In FIG. 3 are shown the temperature distribution 19 of a crystal growing furnace for manufacturing gallium arsenide by the horizontal Bridgman technique with a particularly increased vapor pressure of excess gallous oxide, the cross sectional diagram of the sealed fused silica reaction tube 9 and a schematic diagram of the high temperature zone 16, intermediate temperature zone 17 and low temperature zone 18 of the electric furnace. Temperature $T_1 = 1250°$ C.–1270° C., $T_2 = 1100°$ C.–1220° C., $T_3 = 610°$ C.–640° C., and $T_m = 1240°$ C., i.e. the melting point of gallium arsenide. In the fused silica reaction tube 9 are found the silica vessel 14 to support a gallium or gallium arsenide melt 10, a seed crystal of gallium arsenide 15, and arsenic 13 placed in the low temperature zone. A silica tube 12 located in the intermediate temperature zone and a thin silica tube 11 having an inner diameter of 1–5 mm. are also shown there. The part played by the thin silica tube 11 is to prevent gallous oxide from diffusing into the low temperature zone and condensing by reaction (2).

In case the length denoted by $L_2$ in FIG. 3 is about equal to or longer than the length denoted by $L_1$, then it is possible to increase the vapor pressure of excess gallous oxide especially for a long time.

Gallium of high purity and silicon were placed in the silica vessel 14, arsenic 13 was placed in the low temperature zone of the fused silica reaction tube, and arsenic trioxide was put in the high temperature zone of that tube. The operation after a steady state was then reached and was the same as that in Example 1 and Example 2. The silicon contamination of the gallium arsenide obtained did not exceed $10^{15}$cm.$^{-3}$ throughout the whole of the crystal.

Besides the aforementioned examples, a fused silica vessel coated with silicon nitride (Si$_3$N$_4$) and a murite $$(3Al_2O_3 \cdot 2SiO_2)$$

vessel were used in place of the fused silica vessel with similar effects.

Furthermore, where a non-silica vessel made of alumina (Al$_2$O$_3$), aluminum nitride or boron nitride (BN) is used in place of the fused silica vessel when preparing gallium arsenide in a sealed fused silica reaction tube, the method adopted in the aforementioned examples may be used without departing from the spirit and scope of this invention. This is said because of the following:

Where a non-silica vessel is used, there will be no silicon contamination from the vessel. However, the fused silica reaction tube may react with the liquid droplets of gallium, for instance, and produce silicon monoxide (SiO), this silicon monoxide causing the silicon contamination of the gallium arsenide melt. If a film of silicon dioxide is previously formed on the surface of the melt in pursuance of the spirit of this invention, however, the vapor of silicon monoxide cannot find its way into the melt, so that no silicon contamination will occur.

Now, it will be described how to control the concentration of residual silicon in gallium arsenide in pursuance of the spirit of this invention. That is to say, the method for suppressing natural contamination with silicon and for controlling at the same time the concentration of residual silicon from the silicon added to the melt will be described.

The method will be explained with reference to a case where a three zone furnace as shown in FIG. 3 is used. In this case, however, it is made possible to choose a specific temperature in a wide range from 800° C. to 1200° C. for the temperature of the intermediate zone. Since the activity of silicon remaining in the melt of gallium arsenide is given by Formula 4, the concentration of silicon can be altered by changing the vapor pressure of gallous oxide. The vapor of gallous oxide has a fixed condensing pressure at a fixed temperature in accordance with Equation 2, so that the value of $P_{Ga_2O}$ can be varied by changing the temperature $T_2$ of the intermediate temperature zone. In consequence, the concentration of residual silicon in the melt of gallium arsenide can be varied by changing the value of $T_2$. This silicon concentration is maintained for a long time by the film of silicon dioxide formed on the surface of the gallium arsenide melt.

Another method for controlling the concentration of residual silicon in the gallium arsenide melt is to add arsenic trioxide in an amount less than that required for oxidizing the silicon added in the melt, so that an excess of silicon may be left behind in the melt. By changing the ratio between the amount of silicon added in the melt and the amount of arsenic trioxide added in the reaction tube, the amount of silicon to be left behind in the melt is controlled, and the silicon concentration will be maintained constant for a long time by the film of silicon dioxide formed on the surface of the melt.

Any of these methods make it possible to control the electron concentration of gallium arsenide at 295° K. over a wide range from about $10^{15}$ cm.$^{-3}$ to $6 \times 10^{18}$ cm.$^{-3}$.

Example 4

A method of manufacturing a single crystal of gallium arsenide with reduced silicon contamination which is doped with a desired amount of an impurity other than silicon will be explained.

Using a furnace having a temperature profile as shown in FIG. 1, the horizontal Bridgman technique was employed just as in Example 1 and Example 2.

When manufacturing gallium arsenide by the horizontal Bridgman technique just as in Example 1 and Example 2, 30.00 g. gallium of a purity of 99.9999% and 1 mg. high purity silicon of an electrical resistivity of 100 ohm cm or more were put in the high purity silica vessel, 34.25 g arsenic of a purity of 99.9999% was put in the low temperature zone of the reaction tube, and 8 mg arsenic trioxide of a purity of 99.9999% was put in the high temperature zone of the reaction tube. Thus a single crystal of gallium arsenide was prepared under the same condition as in Example 2, except that high purity tin of a purity of 99.9999% was added into the silica vessel. The amount of tin added was determined so as to make the tin doping of the gallium arsenide $1 \times 10^{16}$ cm.$^{-3}$. The appearance of the crystal obtained closely resembled that of the crystals obtained in Example 1 and Example 2.

Figure 4:
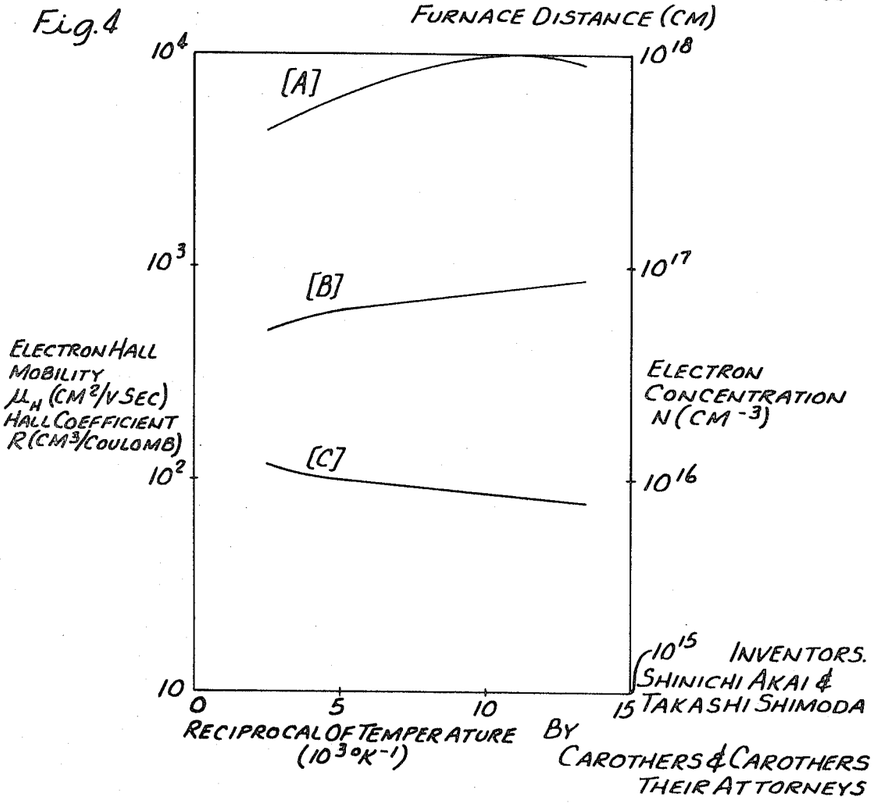
FIG. 4 shows the temperature dependences of the electron concentration, Hall coefficient and electron Hall mobility of gallium arsenide with reduced silicon contamination and doped with approximately $10^{16}$ cm.$^{-3}$ of tin (Sn) which was prepared according to the present invention.

The major properties of the single crystal of gallium arsenide obtained are shown in FIG. 4.

The properties of gallium arsenide with a tin doping level of $1 \times 10^{16}$ cm.$^{-3}$ are shown in FIG. 4. The vertical axis represents the electron concentration, Hall coefficient and electron Hall mobility, and the horizontal axis the reciprocal of temperature. The curve [A] shows the temperature dependence of electron Hall mobility, it being seen that electron Hall mobility reaches 10,000 cm.$^2$/v.sec. at 77° K. The curve [B] shows the temperature dependence of Hall coefficient. The curve [C] shows the temperature dependence of electron concentration.

The concentration of the impurity calculated through analysis from these properties was such that the concentration of shallow donor impurity was $1.53 \times 10^{16}$ cm.$^{-3}$ and the concentration of shallow acceptor impurity was $2.99 \times 10^{15}$ cm.$^{-3}$, the values being corresponding well to the tin doping level of $1 \times 10^{16}$ cm.$^{-3}$.

These properties indicate well that silicon contamination was reduced. By altering the doping level of tin, it was also possible to change the electron concentration at room temperature over a range from $1 \times 10^{15}$ cm.$^{-3}$ to $3 \times 10^{18}$ cm.$^{-3}$.

Example 5

A furnace having a temperature profile as shown in FIG. 1 was used, and the horizontal Bridgman technique was employed just as in Example 1, Example 2 and Example 4. A single crystal of gallium arsenide was prepared just in the same way as in Example 4, except that tellurium (Te) doping was done instead of tin doping. Three kinds of single crystal gallium arsenide, with a doping level of tellurium of $10^{16}$ cm.$^{-3}$, $10^{17}$ cm.$^{-3}$ and $10^{18}$ cm.$^{-3}$ respectively, were prepared. The properties of these crystals are shown in FIG. 5.

Figures 5, 6:
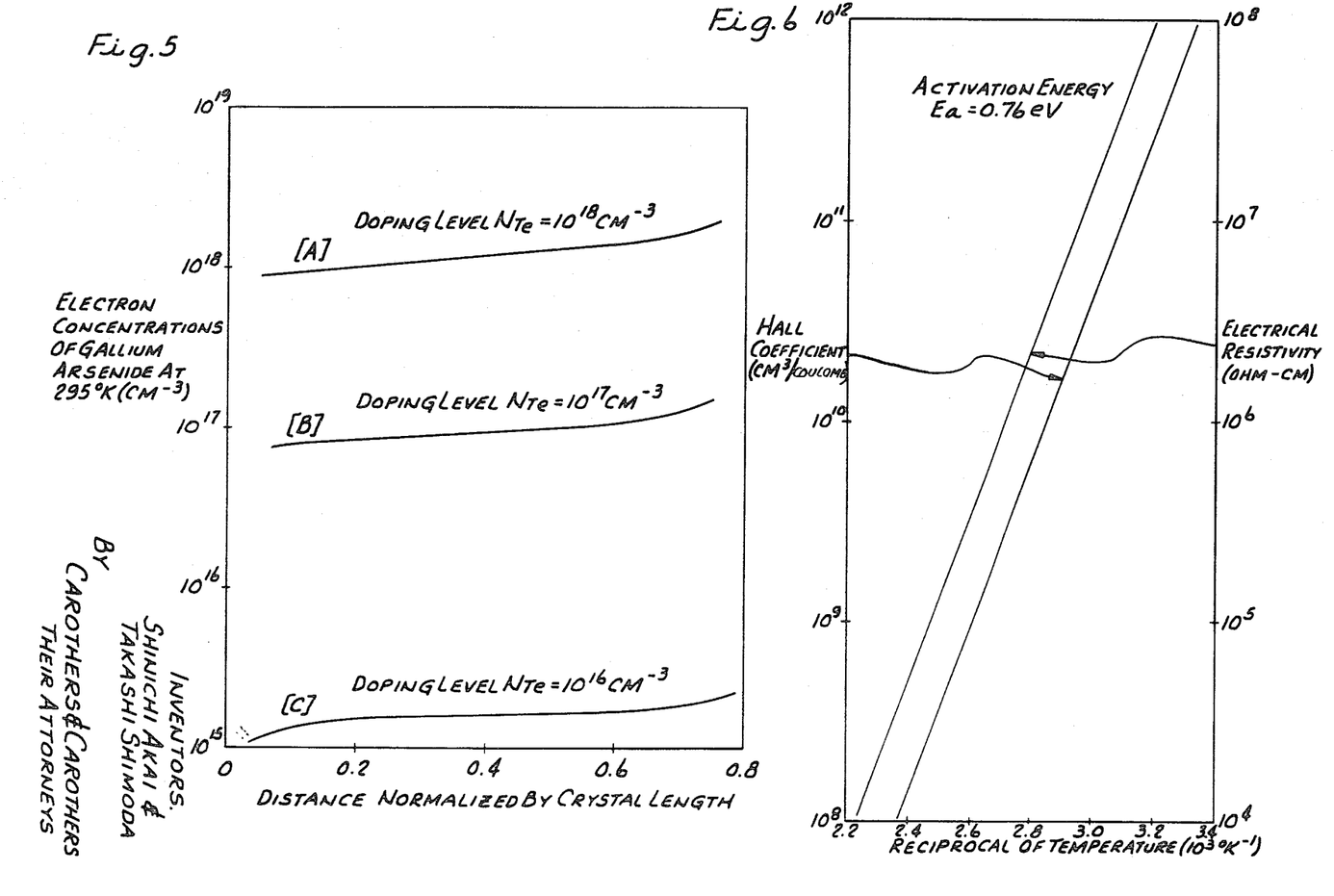
FIG. 5 illustrates the distribution of electron concentration at 295° K. in the longitudinal direction of the crystal of gallium arsenide with reduced silicon contamination and doped with tellurium (Te) which was prepared according to the present invention.
FIG. 6 shows the temperature dependences of the electrical resistivity and Hall coefficient of gallium arsenide with reduced silicon contamination and doped with 0 032 p.p.m. of chromium (Cr) which was prepared according to the present invention.

In FIG. 5, the vertical axis represents electron concentration at 295° K. and the horizontal axis the distance normalized by crystal length from the front of the gallium arsenide crystals. The curve [A] shows the property of the crystal with tellurium doping level of $10^{18}$ cm.$^{-3}$, the curve [B] that with tellurium doping level of $10^{17}$ cm.$^{-3}$, and the curve [C] that with tellurium doping level of $10^{16}$ cm.$^{-3}$. Here also, just as in the case of tin doping, the electron concentration at room temperature could be varied over a range from $1 \times 10^{15}$ cm.$^{-3}$ to $5 \times 10^{18}$ cm.$^{-3}$ by varying the doping level.

Example 6

A furnace having a temperature profile as shown in FIG. 1 was used, and the horizontal Bridgman technique was employed just as in Example 1, Example 2, Example 4 and Example 5. Single crystals of gallium arsenide were prepared quite in the same manner as in Example 4, except that doping with chromium was done instead of with tin. Although the doping level of chromium was varied over a range from $1 \times 10^{15}$ cm.$^{-3}$ (0.02 p.p.m.) to $1 \times 10^{17}$ cm.$^{-3}$ (2 p.p.m.), all the crystals of gallium arsenide showed an electrical resistivity at 295° K. not less than $10^6$ ohm cm. An example of the properties of high resistivity gallium arsenide doped with a very small amount of chromium is shown in FIG. 6.

In FIG. 6 are shown the properties of high resistivity gallium arsenide of a chromium doping level of $1.6 \times 10^{15}$ cm.$^{-3}$ (0.032 p.p.m.). The vertical axis represents Hall coefficient and electrical resistivity, and the horizontal axis the reciprocal of temperature. The activation energy obtained from the temperature dependence of the two properties was $\epsilon_a = 0.76$ e.v. The fact that gallium arsenide having high resistivity could be obtained by doping such a small amount of chromium as 0.032 p.p.m. is a proof that silicon contamination was reduced.

Since semi-insulating gallium arsenide can be obtained with a smaller amount of chromium doping than heretofore required, this invention can be taken advantage of for the manufacture of high quality semi-insulating gallium arsenide which is free from undesirable chromium precipitate and crystal defects.

Apart from the aforementioned examples and in addition to tin, tellurium and chromium, it is also possible to control the doping level of germanium (Ge), suphur (S), selenium (Se), zinc (Zn), cadmium (Cd), magnesium (Mg), iron (Fe), cobalt (Co), nickel (Ni), manganese (Mn), vanadium (V), etc. over a wider range than before. It is evident that besides these elements, the compounds of these elements may be used as doping materials.

Now it will be mentioned that the method of this invention can be utilized when employing the zone refining technique and the zone leveling technique.

When the zone refining technique is employed, the gallium compound which was once crystallized must be partially remelted. During this process silicon contamination from the fused silica vessel supporting the gallium compound is unavoidable. As one method for solving this problem, the liquid-encapsulation zone melting technique is employed. This technique consists in doing the zone melting with the surface of the crystal covered with the liquid of boric oxide. However, it has the drawbacks that, first, boric oxide is hygroscopic and consequently difficult to handle, secondly, that high purity boric oxide is not readily available, and, thirdly, that the crystal of synthesized gallium compound is required as a raw material. It will now be described how these drawbacks are removed when carrying out the zone melting techniques of gallium arsenide.

Figure 7:
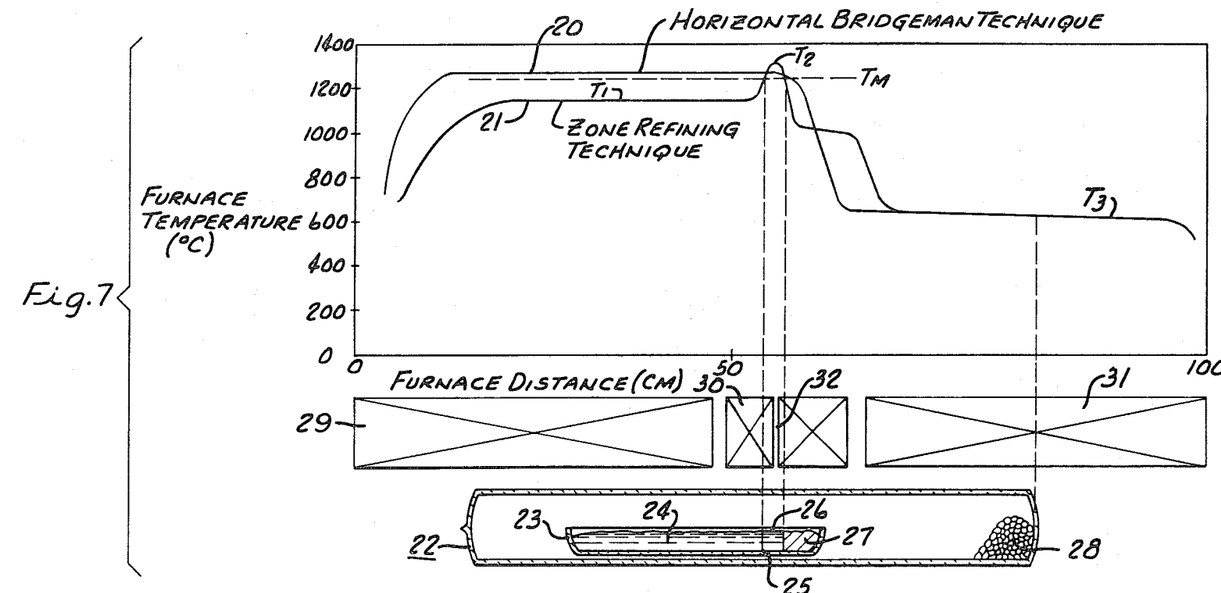
FIG. 7 shows a cross sectional diagram and furnace temperature distribution to illustrate a third technique of the present invention for manufacturing the high purity gallium arsenide with reduced silicon contamination by the zone refining technique.

In FIG. 7 are shown a cross sectional diagram to illustrate the method of manufacturing high purity gallium arsenide with reduced silicon contamination by the zone refining technique and the temperature profile of the furnace.

The curve 20 is the temperature profile of the furnace when the horizontal Bridgman technique is employed with this apparatus, and the curve 21 the temperature profile when the zone refining technique is employed. Temperature $T_1 = 700°$ C.$-1220°$ C., $T_2 = 1250°$ C.$-1270°$ C., $T_3 = 610°$ C.$-640°$ C. $T_m$ is the melting point of gallium arsenide, which is approximately $1240°$ C. The electric furnace consists of a high temperature zone 29, a low temperature zone 31 and a melting zone 30. The melting zone 30 is provided with a window 32 to permit viewing the melting of gallium arsenide. A fused silica vessel 23 is placed in a sealed fused silica reaction tube 22, and arsenic 28 in the low temperature zone of the reaction tube. Gallium or gallium arsenide 24, 25 and the seed 27 of gallium arsenide single crystal are placed in the fused silica vessel 23. 25 marks the melting zone of gallium arsenide. Since silicon and arsenic trioxide are previously added to the gallium or gallium arsenide, a thin film 26 of silicon dioxide is formed on the surface of gallium arsenide in a steady state. The part played by this film was already explained.

Example 7

With the zone refining furnace shown in FIG. 7 in use, gallium arsenide with reduced silicon contamination was prepared by the zone refining technique.

Referring to FIG. 7, 100 g. gallium of a purity of 99.9999% and 6 mg. of high purity silicon having an electrical resistivity of 100 ohm cm. or more were placed in the fused silica vessel 23. A single crystal of a crystal direction <311> was used as the single crystal seed 27 of gallium arsenide. 120 g. arsenic of a purity of 99.9999% was placed in the low temperature zone of the fused silica reaction tube 22, and 60 mg. arsenic trioxide of a purity of 99.9999% was placed at a location near the fused silica vessel. The fused silica reaction tube was evacuated to a pressure of $5 \times 10^{-6}$ mm. of mercury. While maintaining the temperature profile of the electric furnace as shown by the curve 20, the whole of the electric furnace was moved to the left at a velocity of 20–50 mm. per hour after about one hour had passed since the reaction tube was put into the furnace.

The above mentioned operation brought about the crystal of gallium arsenide having a thin film of silicon dioxide on its surface, like the operation described in Example 1 and others.

Then, the temperature profile of the electric furnace was changed to that represented by the curve 21, and after doing the seeding while inspecting through the window 32, the electric furnace was moved to the left at a velocity of 10 mm. per hour. The gallium arsenide crystal subjected to zone refining in this way was found to have been formed into a single crystal in accordance with the crystal direction <311> of the seed crystal. A thin film of silicon dioxide was found remaining of the surface of the zone refined gallium arsenide single crystal obtained, and both top and bottom of the crystal were shiny. The electron concentration of the crystal at $295°$ K did not exceed $10^{15}$ cm.$^{-3}$. Reduction in silicon contamination was evident.

Example 8

As in Example 7, the zone refining furnace shown in FIG. 7 was used. Gallium arsenide with reduced silicon contamination was cultivated by the zone refining technique from gallium arsenide polycrystal as raw material.

Referring to FIG. 7, 200 g. non-doped gallium arsenide polycrystal synthesized by the horizontal Bridgman technique which had an electron concentration of about $5 \times 10^{16}$ cm.$^{-3}$ at $300°$ K. was placed in the fused silica vessel 23. High purity gallium arsenide having a crystal direction <311> was used as a single crystal seed 27. 6 mg. high purity silicon and 50 mg. arsenide trioxide of a purity of 99.9999% were added in the fused silica vessel 23. 5 g. arsenic of a purity of 99.9999% was placed in the low temperature zone of the reaction tube 22. The fused silica reaction tube was evacuated to a pressure of $5 \times 10^{-6}$ mm. of mercury.

The same operation as in Example 7 was carried out before carrying out the zone refining technique. That is to say, while keeping the temperature profile of the electric furnace as shown by the curve 20, the whole of the electric furnace was moved to the left at a velocity of 20–50 mm. per hours, after about 1.5 hour has passed since the reaction tube was placed in the furnace. As a result of this operation, a gallium arsenide crystal having a thin film of silicon dioxide on its surface was obtained.

Then, the temperature profile of the electric furnace was changed to that shown by the curve 21 and the zone refining technique was employed just as in Example 7.

The gallium arsenic single crystal thus obtained showed an electron concentration at $300°$ K. which did not exceed $10^{15}$ cm.$^{-3}$. This shows that the purity of the product obtained was much higher than that of the gallium arsenide polycrystal used as raw material.

As is evident from Example 7 and Example 8, a single crystal of gallium arsenide could be prepared by putting gallium or gallium arsenide and a very small amount of silicon in the fused silica vessel supporting the material in manufacturing gallium arsenide by the zone refining technique, adding a very small amount of arsenic trioxide in the reaction tube, placing arsenic in the low temperature zone of the reaction tube and employing the zone refining technique after first employing the horizontal Bridgman technique. It was consequently possible to manufacture a single crystal of gallium arsenide uniformly doped with an impurity other than silicon, while reducing silicon contamination, through the use of the zone leveling technique.

If this new technique is employed, the reaction between the fused silica vessel and the melt of gallium or a gallium compound is suppressed at the same time as silicon contamination is reduced. In consequence, there was little wetting of the vessel by the melt, so that a single crystal with few crystal defects could be easily grown. From this it was made evident that the seeding technique could readily be applied. Using gallium arsenide highly doped with silicon as a single crystal seed and carrying out the manufacture in a gallous oxide atmosphere, we manufactured a single crystal of gallium arsenide with little dislocation density in the crystal obtained, with little stress given to the growing crystal.

Example 9

Figure 8:
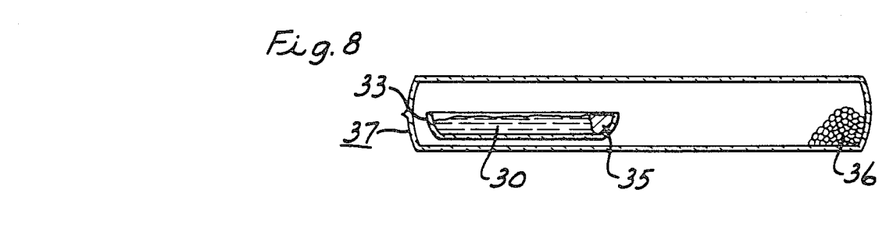
FIG. 8 is a cross sectional diagram to illustrate the method of this invention for manufacturing gallium arsenide with little dislocation density without giving stress to the growing crystal when seeding a single crystal.

The cross sectional diagram of the sealed fused silica reaction tube is shown in FIG. 8. A fused silica vessel 33 of a high purity is contained in a fused silica reaction tube 37. 100 g. gallium, denoted by numeral 34, of a purity of 99.9999% is placed in the fused silica vessel 33. 120 g. arsenic of a purity of 99.9999% was placed in the low temperature zone of the reaction tube. Furthermore, 6 mg. high purity silicon and 50 mg. arsenic trioxide of a purity of 99.9999% were added in the fused silica vessel. As a single crystal seed 35, a single crystal of silicon doped gallium arsenide having a crystal direction $<310>$, a length of 30 mm., a silicon concentration of $2 \times 10^{18}$ cm.$^{-3}$ and a dislocation density of about 1000 was used. The reaction tube was evacuated to a pressure of about $10^{-6}$ mm. of mercury. The horizontal Bridgman technique was carried out in the same manner as in Example 1, except that the moving velocity of the electric furnace was 13 mm. per hour.

The single crystal thus obtained was a high quality crystal having a dislocation density not exceeding 1000 cm.$^{-2}$.

The part played by the silicon doped seed crystal will be understood from the following explanation.

At the interface between silicon doped seed crystal and gallium arsenide melt, the activity of silicon is increased because of the presence of silicon in the seed crystal. In consequence, the reaction (1) progresses overwhelmingly from right to left. Because of this, there will be little wetting of the fused silica vessel by the melt at the interface between the seed crystal and the melt, so that the growing crystal is little subjected to undesirable stress.

In the aforementioned several examples, this invention has been exemplified particularly with respect to cases where a gallium compound, such as gallium arsenide, is melted in a fused silica vessel placed in a sealed fused silica reaction tube, and manufacture is made with simultaneous additions of silicon and an oxide, such as arsenic trioxide. The main object of this invention is to suppress for a long time the silicon contamination from the supporting vessel, particularly a fused silica vessel, when manufacturing a gallium compound in a sealed fused silica reaction tube. Naturally, therefore, the material to be synthesized is not limited to gallium arsenide.

The method of this invention is, therefore, applicable also to the manufacture of such gallium compounds as GaAs, GaP, $Ga_{1-x}In_xAs$, $Ga_{1-x}Al$ As, $GaAs_{1-x}P_x$ and $Ga_{1-x}In_xP$, with reduced silicon contamination, $x$ being a number between 0 and 1. It should further be noted that although the preparation by the horizontal Bridgman technique and the zone refining technique were described in the foregoing examples, the method of this invention can be used also when a gallium compound is prepared by other techniques, such as the magnetic Czochralski method, gradient freeze method, solution growth technique, etc.

While the invention has been particularly shown and described with reference to preferred embodiments thereof, it will be understood by those skilled in the art that the foregoing and other changes in form and details may be made therein without departing from the spirit and scope of the invention.

We claim:

1. A method of manufacturing a gallium compound with reduced silicon contamination in a sealed fused silica reaction tube, which is characterized in that at least one from the group consisting of silicon, a silicon compound, boron, a boron compound, aluminum and an aluminum compound is added in the vessel supporting the melt of the gallium compound, that at least one from the group consisting of oxygen, carbon dioxide and metallic oxides which are unstable at the temperature of the furnace and which can generate the vapor of gallous oxide is added at the same time in the fused silica reaction tube, and that a crystal of the gallium compound is grown with a stable film of oxide formed on the surface of the melt of the gallium compound.

2. The single crystal of a gallium compound manufactured by a method as described in claim 1 and having an electron concentration at a room temperature not exceeding $10^{15}$ cm.$^{-3}$.

3. The single crystal of a gallium compound manufactured by a method as described in claim 1 with a controlled silicon concentration in the gallium compound melt and having an electron concentration at a room temperature of $10^{15}$ cm.$^{-3}$–$6 \times 10^{18}$ cm.$^{-3}$.

4. A method of manufacturing a gallium compound with reduced silicon contamination and doped with an impurity in a sealed fused silica reaction tube, which is characterized in that at least one from the group consisting of silicon, a silicon compound, boron, a boron compound, aluminum and an aluminum compound and simultaneously an impurity electrically active in the gallium compound are added in the vessel to support the melt of the gallium compound, that at least one from the group consisting of oxygen, carbon dioxide and metallic oxides which are unstable at the temperature of the furnace and which can generate the vapor of gallous oxide is added at the same time in the fused silica reaction tube, and that the crystal of a gallium compound doped with an impurity is grown with a stable film of oxide formed on the surface of the melt of the gallium compound.

5. A single crystal manufactured by a method as described in claim 4 with reduced silicon contamination and doped with an impurity which is electrically active in a gallium compound.

6. A method of manufacturing gallium arsenide with reduced silicon contamination in a sealed fused silica reaction tube, which is characterized in that silicon is added in the fused silica vessel to support the melt of gallium arsenide, that arsenic trioxide is added at the same time in the fused silica reaction tube, and that the crystal of gallium arsenide is grown with the vapor of gallous oxide generated and the film of silicon dioxide formed on the surface of the melt of the gallium arsenide.

7. A method of manufacturing in a sealed fused silica reaction tube gallium arsenide with reduced silicon contamination and doped with an impurity electrically active in gallium arsenide, which is characterized in that silicon and the impurity are simultaneously added in the fused silica vessel to support the melt of gallium arsenide, that arsenic trioxide is added in the fused silica reaction tube, and that the crystal of gallium arsenide doped with the impurity is grown with vapor of gallous oxide generated and a film of silicon dioxide formed on the surface of the melt of gallium arsenide.

8. The single crystal of chromium doped gallium arsenide manufactured by a method as described in claim 7 whose chromium content does not exceed 2 p.p.m. and which is a high resistivity gallium arsenide having an electrical resistivity at room temperatures of $10^6$ ohm cm. or more.

9. The crystal of tin doped gallium arsenide manufactured by a method as described in claim 7 whose electron concentration at room temperature is $$10^{15} \text{ cm.}^{-3}\text{–}5 \times 10^{16} \text{ cm.}^{-3}$$

10. A method of manufacturing a gallium compound with little dislocation density in a sealed fused silica reaction tube, which is characterized in that the single crystal of silicon doped gallium compound is used as a single crystal seed, that at least one from the group consisting of oxygen, carbon dioxide and metallic oxides which are unstable at the temperature of the furnace and which can generate the vapor of gallous oxide is added in the fused silica reaction tube, and that the crystal of gallium compound is grown with a stable film of oxide formed on the surface of the melt of the gallium compound.

11. A method of manufacturing a zone refined gallium compound with reduced silicon contamination in a sealed fused silica reaction tube, which is characterized in that at least one from the group consisting of silicon, a silicon compound, boron, a boron compound, aluminum and an aluminum compound is added in the vessel to support the melt of the gallium compound, that at least one from the group consisting of oxygen, carbon dioxide and metallic oxides which are unstable at the temperature of the furnace and which can generate the vapor of gallous oxide is added in the fused silica reaction tube, and that the crystal of the gallium compound is grown by the zone refining technique with a stable film of oxide formed on the surface of the melting zone of the gallium compound.

References Cited
UNITED STATES PATENTS 3,476,593    11/1969    Lehrer _____________ 117—201
3,484,302    12/1969    Maeda et al. ______ 117—201 X WILLIAM L. JARVIS, Primary Examiner U.S. Cl. X.R.

117—106; 23—204

UNITED STATES PATENT OFFICE
CERTIFICATE OF CORRECTION

Patent No. 3,623,905      Dated November 30, 1971

Inventor(s) Shinichi Akai Et Al

It is certified that error appears in the above-identified patent and that said Letters Patent are hereby corrected as shown below:

Column 1, line 18, "$Ga_{1x-x}In_xAs$", should read, --$Ga_{1-x}In_xAs$--;

Column 2, Formula (1), line 15, should read,
--$4Ga + SiO_2 \rightleftarrows 2Ga_2O + Si$--;

Column 2, Line 43, "(1967," should read --(1967)--;

Column 3, Line 24 "represeted" should read, --represented--;

Column 5, Line 66 "0 032" should read --0.032--;

Column 7, Line 27, ":" should be corrected to --.--;

Column 7, Line 60, "belt" should read --melt--;

Column 8, Line 55, "and" should be deleted;

Column 8, Line 60, "murite" should be corrected to --mullite--;

Column 9, Line 24, "$P_{Ga_2}O$" should read --$PGa_2O$--;

Column 10, Line 63, "$\varepsilon_a = 0.76$ e.v." should read --$\varepsilon_a$ 0.76 e.V.--;

Column 12, Line 45, "300°K." should read --300°K--;

Column 13, Line 48, Line 49, "$Ga_{1-x}In_xAs$, $Ga_{1-x}Al\ As$, $GaAs_{1-x}P_x$ and $Ga_{1-x}In_xP$," should read --$Ga_{1-x}In_xAs$, $Ga_{1-x}Al_xAs$, $GaAs_{1-x}P_x$ and $Ga_{1-x}In_xP$,--;

Fig. 8, numeral "30" should read --34--;

Signed and sealed this 7th day of November 1972.

(SEAL)
Attest:

EDWARD M. FLETCHER, JR.
Attesting Officer

ROBERT GOTTSCHALK
Commissioner of Patents